July 18, 1950 — E. PALMER — 2,515,794
METHOD OF PREPARING COCOA EXTRACTS
Filed May 15, 1946
MANUFACTURE OF CHOCOLATE EXTRACT
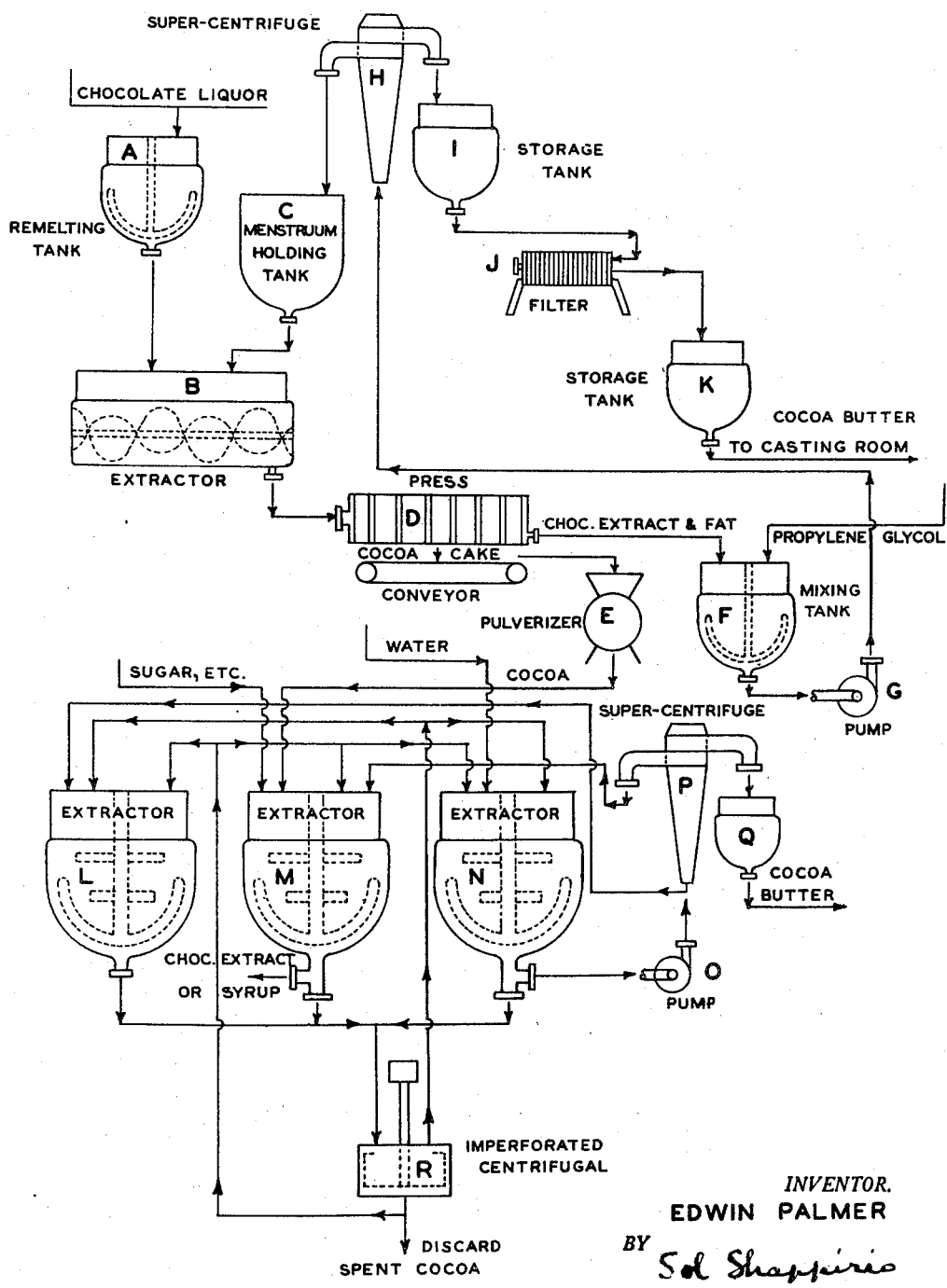
INVENTOR.
EDWIN PALMER
BY Sol Shappirio
ATTORNEY Patented July 18, 1950

2,515,794

UNITED STATES PATENT OFFICE 2,515,794

METHOD OF PREPARING COCOA EXTRACTS

Edwin Palmer, Baltimore, Md., assignor, by mesne assignments, to Moorehead Manufacturing Co., Inc., Baltimore, Md., a corporate body of Maryland Application May 15, 1946, Serial No. 669,801

11 Claims. (Cl. 99—26)

This invention relates to the production of cocoa powders, chocolate extracts and flavors, cocoa butter, and compositions containing such products, as well as methods for producing them.

The prior art methods utilized in producing cocoas have failed to produce products of the finest flavor and also exhibit other difficulties. In the usual methods employed in making cocoas, the cleaned and sorted beans are subjected to a roasting process at a temperature of 140° C. to 300° C. which develops the aroma of chocolate and also dries the shell, facilitating its removal. The beans are then crushed and the shells are removed. The crushed and shelled beans are then usually made into a thin paste by grinding between stones or heated rollers. The resultant liquid mass is known as chocolate liquor. Cocoas of varying fat content are produced by expressing a portion of the cocoa butter from the chocolate liquor in a hydraulic press and then crushing, grinding and sifting the residue into a fine powder.

By employing tremendous pressures on the chocolate liquor for long periods of time, cocoas having a fat content as low as 10% can be obtained. To obtain low-fat cocoas of less than 10% cocoa butter content, it is necessary to resort to other extraction methods which are very costly. Furthermore, it is generally known that the cocoas of lower fat content produced in this way have a poorer flavor than those containing more fat and none of them approach the flavor of the chocolate liquor used in the preparation of said cocoas. This is believed to be due to the absorption by the cocoa butter of the aromatic oils developed in the beans during the roasting process, which butter is a better solvent for these oils than the residual cocoa which consists for the most part of albuminoids, starches, tannins, alkaloids, cellulose materials and the like. So that such prior art practices illustrate the many shortcomings in the quality of cocoa powders and chocolate flavored extracts produced.

Among the objects of the present invention is the preparation of a relatively low fat cocoa with a fully developed chocolate flavor.

Other objects include the production of liquid chocolate extracts.

Further objects include the preparation of chocolate flavored drinks by utilization of the extracts produced or even of the improved cocoas.

Still further objects include methods for treating chocolate liquor to produce products of the character set forth above and other materials.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In connection with that more detailed description, there is shown in the accompanying drawing, a flow sheet illustrating methods of carrying out the present invention.

In accordance with the present invention it has been found that chocolate liquor may be processed by adding thereto substances which expel the fat in the cocoa cells liberating the cocoa butter. While chocolate liquor is particularly indicated to be utilized in the present invention, other forms of the cocoa bean may be used but the chocolate liquor is preferable since in this form it is best processed while containing the full flavor.

The substances which are utilized to replace the fat in the cocoa cell or expel the fat from it particularly include the glycols and glycol ethers and glycerine to some extent exhibits desired characteristics not, however, as satisfactory as propylene glycol. The invention will be illustrated by the utilization of propylene glycol which has specific value for utilization in carrying out the present invention because it possesses a definite penetrating characteristic whereby it is able to permeate the cellular walls of the cocoa powder and liberate the fat. Also because of its preferred solvent properties it dissolves appreciable amounts of the tannins, proteins, starches, and flavor oils, which result in the further breakdown of the cocoa. The propylene glycol also possesses the desirable characteristics of not being fat soluble and at the same time exhibits a retarding emulsifying action. In view of these special properties of propylene glycol it is capable of being used to extract the desired chocolate flavor from the cocoa without the mixture becoming very thick or fudgelike, the latter resulting where water is used.

In carrying out the present invention then chocolate liquor, for example, is treated with propylene glycol to liberate the cocoa butter contained therein. The propylene glycol replaces the fat in the cocoa cells quite readily. A substantial portion of the cocoa butter may be readily obtained by decanting it from the treated material but more desirably in carrying out the present invention the mass is kept well mixed in order to maintain it in a fluid state, and furthermore, to enable the propylene glycol to extract the aromatic oils from the fat, which it does to a large extent since it is a better solvent for the aromatic oils than the cocoa butter.

Desirably the treatment of the chocolate liquor with the propylene glycol is carried out while heating and agitating the materials together. The temperature employed should desirably be above the melting point of the fat, for example, above approximately 100° F., and of course, should not be so high as to produce a burned taste or other undesirable characteristic in the products undergoing processing. A temperature of about 90° C. may desirably be utilized in this treatment.

The chocolate liquor mixed with the propylene glycol is maintained at the stated temperature and the mixture stirred for about ½ hour. Any time period may be utilized but that indicated is sufficient under the conditions given, particularly if the stirring or agitation is sufficient to produce intimate admixture. After such treatment the fluid mixture is desirably passed to a hydraulic press and pressure applied. The conventional pressing operation may be utilized at this point to express about 95% of the available fat. Some of the propylene glycol-chocolate extract is also expressed but this can be readily separated from the cocoa butter. Such separated propylene glycol-chocolate extract may be returned to the cocoa or it may be used as part of the menstruum for a following batch. By using the expressed propylene glycol-chocolate extract as part of the menstruum for subsequent batches, it will soon have dissolved the full amount of the chocolate material so that in subsequent batches, the amount of propylene glycol-chocolate extract retained by the cocoa will have the full quantity of flavor necessary for the amount of chocolate liquor used without requiring return to it of the expressed propylene glycol-chocolate extract. The cocoa obtained at this point possesses a fine flavor equal to that of the chocolate liquor employed for treatment.

The cocoa produced in this way is a new product of excellent flavor characteristics and may be utilized in a variety of ways. It may be employed by the chocolate and related industries in substantially the same way that regular cocoa is used with the advantage, however, of exhibiting a fine flavor and in addition being more soluble than ordinary cocoa. These characteristics are possessed despite the relatively low fat content and advantage of this may be taken to avoid the necessity for utilizing the more costly high fat cocoas in order to obtain a better flavor. The products of the present invention can readily be used to advantage over other low fat cocoas in the preparation of stabilized chocolate flavored milk drinks in view of its superior and stronger flavor and smaller quantities of it can thus be employed to produce the flavor ordinarily obtainable only with much larger amounts of prior art products.

In lieu of utilizing the cocoa product directly, it may be treated to produce chocolate flavored concentrated extracts therefrom of particular value in the arts, as for example, to bottlers of carbonated beverages to produce a chocolate flavored carbonated beverage having a long shelf life without spoilage, which does not settle out or cause an unsightly cream line in the bottle. Such bottlers may manufacture the beverage by utilizing regular equipment without the necessity of additional equipment or further processing, also eliminating stabilization of the beverage through the aid of sodium alginate, agar, and the like, as well as sterilization by heating, etc. Desirably the extract is produced by means of an aqueous medium such as water, milk, etc.

Thus the cocoa may be processed to produce the chocolate flavored concentrated extract by extraction with hot water desirably carried out in a multiple extraction zone. In such multiple stage extractions, continuous methods may be employed and the menstruum for a first extraction of the processed cocoa may be utilized as the wash from a preceding batch. In addition if desired, alkalies may be added during this step to produce a "Dutch" type of chocolate flavor. In such multiple extractions, a second extraction may be made of the spent cocoa by using as the menstruum, the second wash from a preceding batch to produce in turn a first wash for the following fresh batch of processed cocoa. A further wash is obtained in the same manner as above and the flavor and other desirable products of the cocoa thus extracted.

The extraction may be carried out in any desired way, preferably at somewhat elevated temperatures for varying periods of time depending on the particular materials employed and the conditions under which they are processed. Closed jacketed vessels fitted with suitable mixing devices are desirably employed and a specific range of temperature which may be utilized is, for example, from 85° C. to 95° C., while time periods of half-hour extent are sufficient. The vessels are desirably kept closed to prevent losses of volatile aromas during processing.

Variations in the extraction procedure may be carried out depending on whether multiple zone extraction is employed or not. For example, as will be illustrated below, after the processed cocoa has been treated with the water, the mixture may be separated in a suitable centrifugal, the liquid portion passed into a mixing tank and the residue or cake conveyed to another mixing tank containing menstruum for the next extraction. The effluent obtained from the extraction of the fresh processed cocoa may be passed through a super-centrifuge to remove the slight amount of cocoa butter liberated in the treatment and also to remove the more difficult settling residue. This extract may be filtered in any desired way but is not essential and filtration is desirably avoided in order to eliminate any possible loss of desirable constituents. Where filtration is employed, filter aids may be utilized to produce a clear extract.

The insoluble materials remaining in the extract are colloidal and do not separate to any noticeable extent on standing for relatively long periods of time.

The extract may be pumped to a jacketed mixing tank and utilized in any desired way. For example, sugar and other materials such as caramel color, vanillin, etc., may be added. This flavored syrup may be heated to 95° C. in order to eliminate any bacteria, yeast, mold and enzymes which may have been carried along with the sugar and other ingredients. The syrup is in a sterile condition at this stage but if desired sodium benzoate may be added to further inhibit the possibility of spoilage caused by unsterile water or bottles, etc. The flavored syrup produced as set forth above may be added to milk, hot or cold, and with or without cream to produce fine chocolate flavored milk drinks which show substantially no settling out and which can be produced to show a true cream line if desired. The chocolate flavored milk drink containing cream can also be homogenized without any deleterious effects. It is thus possible to produce chocolate flavored milk drinks containing natural color and flavor which do not require any stabilizers and which may show a cream line if desired. In fact it is possible to treat milk with the processed cocoa itself and separate insoluble residual matter by centrifugals to produce a very excellent chocolate flavored milk.

In chocolate flavored milk drinks produced as set forth above, it is usually necessary to add caramel color or the like to obtain sufficient color. However, chocolate flavored drinks with natural color and flavor may be obtained in accordance with the present invention in additional ways. For example, about 4 ounces of said processed cocoa may be added to each gallon of skimmed milk while the latter is being pasteurized. The mixture may be stirred and then passed through a centrifugal to remove the bulk of the residue and finally through a super-centrifuge to remove the last traces of separable solids and cocoa butter. A fine and full-flavored delicious chocolate milk drink is readily obtained by the addition of the necessary amount of sugar. Any desired amount of cream can be added to produce a cream line or else it may be homogenized to make a stable product exhibiting no settling out.

Chocolate flavored milk drinks may also be produced by processing milk as above with the regular cocoa or "Dutch" processed cocoas, but the results are not comparable with the utilization of the processed cocoa produced in accordance with the methods set forth herein.

A further embodiment of the invention is illustrated in the production of a clear concentrated chocolate flavor by the addition of alcohol to the water extraction of the processed cocoa, followed by filtering to remove the starches and proteins thrown out of solution. The clear chocolate flavor thus produced may be used for general flavoring purposes and to make cocoa cream beverages, cordials, and the like. A somewhat similar clear chocolate flavor may also be obtained by the addition of alcohol to the propylene glycol-chocolate extract expressed from the processed cocoa.

As illustrating methods that may be employed in carrying out the present invention, the flow sheet of the drawing illustrates in diagrammatic form operations thus utilized. For this purpose, a series of batches are made until a constant propylene glycol-chocolate extract menstruum and also constant "1" and "2" washes are produced.

The chocolate liquor is added to the remelting jacketed kettle A. The menstruum in the holding tank C consisting of the expressed propylene glycol-chocolate extract of the previous batch plus the required amount of additional propylene glycol to replace that retained by the cocoa, is added to the extractor B. The extractor may be a jacketed horizontal mixing tank fitted with a suitable mixing device preferably of the ribbon type so as to produce efficient and vigorous mixing. The menstruum is heated to 90° C. and the melted chocolate liquor is added to it while stirring. A large amount of the fat is soon liberated and this is kept well mixed with the rest of the mixture. After one-half hour of mixing at 90° C., the fluid mass is pumped into the hydraulic press D which is desirably of the Carver automatic type. The effluent from the press D is run into the jacketed mixing tank F. The requisite amount of propylene glycol is then added and mixed with the expressed propylene glycol and chocolate extract. The mixture is kept fluid by warming and the additional propylene glycol absorbs more of the essential oils retained by the cocoa butter. The mixture is then pumped by the pump G through the super-centrifuge H which separates the menstruum from the cocoa butter. The cocoa butter is run into a jacketed melting tank I and then filtered through filter J into the storage tank K, where it is removed to the casting room to be cast into cakes. The menstruum is passed into the holding tank C to be used for a following batch of the same size.

The residue from the press D is ejected as a dry cake. This is finely ground in the pulverizer E. This cocoa may be utilized by the chocolate and related industries to replace regular cocoa or it may be further processed to make a chocolate flavored extract or utilized in any desired way as set forth above.

The jacketed mixing tank M which is equipped with a suitable mixing device, contains the first wash "1" of a previous batch. This is heated to 90° C. and the powdered processed cocoa is added to it and mixed at 90° C. for one-half hour. The mixture is then added to the centrifugal R which separates the extract from the solids. The effluent is passed into the tank N which is similar to tank M. The cake formed in the centrifugal R which consists of the spent cocoa with absorbed water is removed from the centrifugal and added to tank L which is a tank similar to M and which contais the second wash "2" of a similar previous batch heated to 90° C.

The effluent in tank N is further clarified by pumping it with pump O through the super-centrifuge P equipped with a clarifier bowl. A small amount of cocoa butter which may be liberated from the cocoa at this point is collected in the tank Q. The fat can be further refined and added to the original cocoa butter. A small amount of cake will form in the bowl of the centrifuge and this may also be added to tank L. The chocolate extract from the centrifuge is passed into the tank M. The remainder of the ingredients as sugar, caramel color, vanillin, and the like, may be added and the mixture heated to 90° C. and then cooled. A finished product may thus be produced which can be filled into suitable containers.

The mixture in tank L is mixed at 90° C. for one-half hour and then passed through the centrifugal R. The effluent is passed into tank M to become wash "1" to be used as the menstruum for a following batch. The cake formed in the centrifugal R is then added to the tank N which contains the requisite amount of water heated to 90° C.

The mixture in tank N is stirred at 90° C. for ½ hour and then passed through the centrifugal R. The effluent is passed into the tank L to become the second wash "2" which is to be used as the menstruum for a following batch. The cake formed in the centrifugal R may be discarded.

The methods and procedures referred to above are illustrative of procedures that may be carried out in connection with the present invention. A chocolate flavored syrup may be produced by the process as illustrated—when using about two pounds of chocolate liquor to produce one gallon of flavored syrup—which has a fully developed chocolate flavor and which may be used to make a carbonated beverage that will not spoil and which possesses a delicious chocolate flavor. The syrup can also be added to milk to produce a very delicious, palatable chocolate flavored milk drink.

Having thus set forth my invention, I claim:

1. The method of making cocoa which comprises treating chocolate liquor with propylene glycol to liberate the cocoa butter contained therein.

2. The method of making cocoa which comprises heating and agitating chocolate liquor with propylene glycol and separating the cocoa butter and glycol from the resulting cocoa, the latter carrying the chocolate flavoring material liberated by the glycol.

3. The method of making cocoa which comprises heating and agitating chocolate liquor with propylene glycol, separating the cocoa butter and glycol from the resulting cocoa, and separating from the cocoa butter any residual propylene glycol-chocolate extract contained therein.

4. The method as set forth in claim 3 which includes the step of returning the separated propylene glycol-chocolate extract to the cocoa.

5. The method as set forth in claim 3 which includes the step of mixing the propylene glycol-chocolate extract with further propylene glycol and heating and agitating a further batch of chocolate liquor with said mixed extract and glycol.

6. The method as set forth in claim 3 which includes the step of heating and agitating a further batch of chocolate liquor with said residual extract and added propylene glycol.

7. The method of making a chocolate extract which comprises heating and agitating chocolate liquor with propylene glycol, separating the cocoa butter and glycol from the resulting cocoa, and extracting said cocoa with an aqueous medium to produce a water soluble chocolate extract.

8. The method of making a chocolate extract which comprises heating and agitating chocolate liquor with propylene glycol, separating the cocoa butter and glycol from the resulting cocoa, and extracting said cocoa with water to produce a water soluble chocolate extract.

9. The method of making a chocolate extract which comprises heating and agitating chocolate liquor with propylene glycol, separating the cocoa butter and glycol from the resulting cocoa, and extracting said cocoa with milk to produce a chocolate flavored milk.

10. The method of making a chocolate extract which comprises heating and agitating chocolate liquor with propylene glycol, separating the cocoa butter and glycol from the resulting cocoa carrying the chocolate flavoring material liberated by the glycol, extracting said cocoa with an aqueous medium to produce a water soluble chocolate extract, and separating from said water soluble extract residual cocoa butter contained therein.

11. The method of making a chocolate extract which comprises heating and agitating chocolate liquor with propylene glycol, separating the cocoa butter and glycol from the resulting cocoa, carrying the chocolate flavoring material liberated by the glycol, extracting said cocoa with an aqueous medium to produce a water soluble chocolate extract, and adding alcohol to said water soluble extract to separate starch and protein and removing said separated material to produce a substantially clear chocolate flavoring material.

EDWIN PALMER.

REFERENCES CITED

The following references are of record in the file of this patent:

UNITED STATES PATENTS

| Number | Name | Date |
|---|---|---|
| 1,073,441 | Riddle | Sept. 16, 1913 |
| 1,487,449 | Eddy | Mar. 18, 1924 |
| 1,855,026 | Livingston | Apr. 19, 1932 |
| 2,200,391 | Freeman | May 14, 1940 |

FOREIGN PATENTS

| Number | Country | Date |
|---|---|---|
| 116,694 | Great Britain | of 1919 |

OTHER REFERENCES

"Methods of Analysis," 6th edition, 1945.